Patented Oct. 11, 1938

2,132,436

UNITED STATES PATENT OFFICE 2,132,436

FOOD MATERIAL AND METHOD OF MAKING SAME

Marvin C. Reynolds, Benjamin R. Harris, and Albert K. Epstein, Chicago, Ill.; Lulu E. Reynolds and First National Bank of Chicago, executors of said Marvin C. Reynolds, deceased, assignors to The Procter and Gamble Company, Cincinnati, Ohio, a corporation of Ohio No Drawing. Application March 5, 1934, Serial No. 714,112

12 Claims. (Cl. 99—94)

Our invention relates to food materials, particularly dry, pulverulent ingredients including baking powder, employed in making baked flour products.

The principal object of our invention is to produce an improved baking powder leavened baked flour product.

Another object of our invention is to improve pulverulent materials intended for use in baked flour products.

Another object is to overcome some of the problems that have existed in the production, storage, and use of pulverulent materials intended for use in baked flour products.

Another object is the provision of an improved type of pulverulent material of the character set forth.

A further object is to add to pulverulent materials of the character set forth an additional type of material which will not only effect an improvement in the pulverulent material, but overcome some of the problems attending its use heretofore.

In accordance with the general features of the invention, we combine with pulverulent ingredients such as farinaceous materials, including flour and starch and other ingredients used in baking industries such as sugar, baking powder ingredients and the like, a proportion of a material which we term a hydrophilic lipin. We include within the term "hydrophilic lipin" relatively high molecular weight, edible, aliphatic derivatives of water soluble polyhydroxy substances such as glycerine, polyglycerols, sugars, sugar alcohols, and hydroxy-carboxylic acids, the derivatives being of a character having a free hydroxy groups. The greater the number of free hydroxy groups with a particular aliphatic radical, the greater are the hydrophilic properties of the hydrophilic lipin. Considered from another aspect, the hydrophilic lipins are oleaginous materials which have been modified by the inclusion in the molecule of a radical having free hydroxy groups whereby a hydrophilic character is imparted to the oleaginous material.

The aliphatic radical may be linked to the residue of the polyhydroxy substance either through an ester or ether linkage. For example, we may use monostearine (monostearyl glycerol), palmityl ether of glycerine, a material formed by esterifying the fatty acid esters of lard with glycerine to produce compounds having free hydroxy groups, or a mixture of esters formed by re-esterifying the fatty acid glycerides of cottonseed oil, corn oil, or other vegetable or animal fats or oils, such as hydrogenated vegetable oils, with either glycerine, polyglycerols, hydroxy-carboxylic acids, or sugar alcohols, the esters so formed having free hydroxy groups.

In the following detailed description, specific applications of the invention will be described and additional specific objects and features will become apparent.

For the convenience of those skilled in the art, we list hereinbelow a few illustrative examples of hydrophilic lipins of the character hereinabove set out, all of which may be employed in our invention:

$$C_{17}H_{35}\overset{O}{\overset{\|}{C}}-O-CH_2-\overset{OH}{\overset{|}{C}H}-CH_2OH \quad \text{Monostearin}$$

$$C_{17}H_{35}\overset{O}{\overset{\|}{C}}-O-CH_2-\overset{OH}{\overset{|}{C}H}-CH_2-O-\overset{O}{\overset{\|}{C}}-C_{17}H_{33} \quad \text{Stearo-olein}$$

$$C_{29}H_{59}\overset{O}{\overset{\|}{C}}-O-CH_2-\overset{OH}{\overset{|}{C}H}-CH_2-O-CH_2-\overset{OH}{\overset{|}{C}H}-CH_2-OH \quad \text{Melissyl diglycerol}$$

$$C_{11}H_{23}\overset{O}{\overset{\|}{C}}-O-CH_2-\overset{OH}{\overset{|}{C}H}-CH_2-O-CH_2-\overset{OH}{\overset{|}{C}H}-CH_2-O-\overset{O}{\overset{\|}{C}}-C_{11}H_{23} \quad \text{Dilauryl diglycerol}$$

Hard hydrogenated cotton seed oil (melting point 140° F.), re-esterified with an excess of polyglycerols.

$$C_{16}H_{33}O-CH_2-\overset{OH}{\overset{|}{C}H}-CH_2OH \quad \text{Palmityl glycerol ether}$$

$$C_{12}H_{25}-O-CH_2-\overset{OH}{\overset{|}{C}H}-CH_2-O-CH_2-\overset{OH}{\overset{|}{C}H}-CH_2-O-C_{12}H_{25} \quad \text{Dilauryl diglycerol ether}$$

Tristearyl sorbitol
Tripalmityl glucose $$C_{15}H_{31}\overset{O}{\overset{\|}{C}}-O-CH_2-\overset{OH}{\overset{|}{C}H}-CH_2-O-\overset{O}{\overset{\|}{C}}-C_{15}H_{31} \quad \text{Dipalmitin}$$

Trilauryl mannitol
Stearyl mucic acid (disodium salt)
Lauryl gluconic acid (sodium salt)

To those skilled in the art, it is obvious that the examples given are by no means exhausted, but merely show the types of substances used in accordance with the invention. The class is numerous, but it is believed clear that the citation of additional examples is not necessary to a full understanding of the invention. We wish also to point out that although some of the illustrative examples represent single substances, mixtures of hydrophilic lipins may be used very satisfactorily in our invention. Indeed in commercial practice, it is generally much more convenient to prepare mixtures and use them as such than to prepare and use only the single substance. In the following description, examples of mixtures of substances will be given.

The hydrophilic lipins are admixed with the pulverulent material in such a way as to form a final, substantially dry pulverulent-like, or comminuted material adapted to be used in a baking formula and to be marketed in various forms for use in baked products. Although the invention lends itself to use in various embodiments from a commercial standpoint, all of these embodiments have great advantage in that many old problems are avoided and the hydrophilic lipin which in itself has advantages when used in a baked flour product is furnished in a new composition of matter in a substantially dry pulverulent form which keeps in good condition and which can be used with good success and with ease and convenience by both the housewife and the commercial baker.

At this point we wish to point out that hydrophilic lipins may be employed having a wide range of melting points, the type used and the melting point being determined to some extent by the character of the pulverulent product produced. For example, if it is preferable to admix the hydrophilic lipin thoroughly with the other pulverulent ingredients, a type having a high melting point may be used, in which case it may first be reduced to a substantially impalpable form and then combined with the other ingredients. Under certain conditions, it is more advisable to coat one of the pulverulent materials with the hydrophilic lipins and in this case it may be advisable to employ a hydrophilic lipin having a somewhat lower melting point. This distinction and the advantages will be apparent from a consideration of some of the following examples.

According to one manner of carrying out the invention, we re-esterify the fatty acid glycerides of partially hydrogenated cottonseed oil of an approximate melting point between 105 and 125° F. (or somewhat higher if desired) with an excess of polyglycerols or glycerine at a suitable temperature to obtain a large proportion of fatty acid esters having free OH groups; or we may prepare a hydrophilic lipin by heating the partially hydrogenated fat with a large proportion of polygylcerols or glycerine in the presence of a catalyst, such as about $\frac{1}{16}$% of sodium hydroxide based upon the amount of fat, at a sufficiently high temperature and for a sufficiently long time (preferably in an inert atmosphere) to produce substantial quantities of hydrophilic lipins.

For a further consideration of the manner of producing the hydrophilic lipins, we refer to the copending application of Benjamin R. Harris, Serial No. 697,534, filed November 10, 1933, and Serial No. 697,533, filed November 10, 1933.

In producing a pulverulent material adapted for use in the production of ordinary biscuit dough, we may take one of the polyglyceride compositions produced in accordance with Harris application Serial No. 697,533. According to one method of making the polyglycerides, we first prepare a mixture of polyglycerols by adding approximately $\frac{1}{16}$th of a pound of sodium hydroxide to ten pounds of glycerine and heating the mixture with continued stirring in a non-oxidizing atmosphere for about four and one-half hours at about 250° to 275° C. This produces a mixture of various polyglycerols by polymerization. To 640 parts of polyglycerols prepared in this manner, 540 parts of prime leaf lard are added and .54 parts of caustic soda employed as a catalyst. The materials are mixed together and heated with continued stirring until a temperature of about 260° C. is attained. The material is held at this temperature for approximately three hours with continued stirring in an inert atmosphere. The material is then cooled and the excess of polyglycerol is drawn off. The resulting product is a lard-like composition readily dispersible in water and/or other aqueous media.

18 parts of this lard-like product are then ground thoroughly with 20.7 parts of sodium acid pyrophosphate. The hydrophilic lipin may be melted and the finely comminuted pyrophosphate added to it. The mixture is then treated to comminute it as, for example, by spraying it into a colder atmosphere, by grinding it, or in other suitable ways. It is then added to $14\frac{1}{10}$ parts of sodium bicarbonate and $13\frac{1}{10}$ parts of starch. These ingredients are thoroughly mixed together, sifted, and ground. The resulting product is a slow-acting baking powder. If a biscuit dough is made with this baking powder and allowed to stand, the carbon dioxide will not escape readily, as in the case of a dough made with ordinary baking powder. More specifically, such a dough may be allowed to stand for from one-half hour to an hour without causing any deterioration in the volume and texture of the finished product.

As a further example, the above described slow-acting baking powder may be incorporated with 900 parts of flour, 35 parts of milk powder, 20 parts of salt, 50 parts of sugar, and 18 parts of shortening plastic at ordinary temperature. The whole composition may be reduced to a pulverulent dry mixture by sifting the dry ingredients, incorporating them into the shortening by melting the same, and mixing thoroughly and then sifting the final product again to produce a mixture in which all of the ingredients are evenly distributed. The resulting product is a prepared biscuit mix which may be used by the housewife by merely adding water to it to form a dough. The resulting biscuit dough will have a great safety factor in that when allowed to stand for some time, it will not lose carbon dioxide to such an extent as to impair the quality of the final baked biscuit. Even after the biscuit dough has been standing for some time and then baked, the co-action of the various ingredients with the hydrophilic lipin will make possible a proper reaction of the acid ingredients of the baking powder with the sodium bicarbonate in the presence of the moisture which has been thoroughly dispersed by virtue of the hydrophilic lipin to produce a well aerated biscuit. The dry product itself has very good keeping qualities, particularly in that deterioration of the baking powder ingredients is avoided.

As a further example, we can incorporate the hydrophilic lipin with the flour by first converting the hydrophilic lipin to a pulverulent form and then admixing it with the flour to the extent of between 1½% to 2% on the average. In this case, a relatively higher melting point hydrophilic lipin is preferred. As an example, monostearine may be melted and then, by means of air pressure forced through a small orifice, reduced to a fine pulverized product. When monostearine is used alone, it is advisable to use a somewhat larger amount, say about 5% to 6%. When the hydrophilic lipin has been added to the flour in suitable proportions and in a pulverized condition, the mixture is sifted and otherwise treated to secure a thorough distribution. A flour product prepared in this manner possesses many advantages in the preparation of baking powder biscuits, in the production of cakes, and in general for making substantially all types of products in which flour is used. In place of melting and spraying the hydrophilic lipin, other procedures can be used. We can grind the hydrophilic lipin either with the acid constituent of the baking powder and then incorporate this resultant mixture with another pulverulent constituent of the product, or grind directly the hydrophilic lipin with all or a part of the ingredient making up the finished substantially dry biscuit composition.

If desired, other dry ingredients may be incorporated with the flour product described in the preceding paragraph such, for example, as powdered buttermilk, whey powder, powdered milk, salt, sugar, baking powder, shortening, and the like, to produce a dry pulverulent biscuit powder which can be marketed in this manner and which will have good keeping qualities. Although the baking powder in this case is not necessarily coated with the hydrophilic lipin, many of the same advantages are obtained, particularly in that the hydrophilic lipin enhances the dispersion of all of the ingredients when water is added. Moreover, the hydrophilic lipin has an emulsifying action upon all of the ingredients including carbon dioxide formed from the baking powder, so that a comparatively large proportion of carbon dioxide will be maintained in an emulsified condition and will not escape so readily on standing.

The flour composition described hereinabove comprising an intimate mixture of flour and hydrophilic lipin may be employed in cake baking using the ordinary formulas. A better cake will be produced of finer texture and with good keeping qualities. If desired, however, the formula may be modified by increasing the sugar and liquids approximately 25% or more above that usually employed in the cake formula without increasing the amount of egg yolk used. When the formula is so modified, a more tender cake will be produced without impairing the volume thereof.

As an ingredient in pulverulent compositions of the character described, we may employ powdered egg material such as powdered whole eggs or powdered yolks to produce a cake mixture ready for the preparation of certain types of cakes, doughnuts and the like. A convenient method of preparing the complete cake composition in dry form is to use the hydrophilic lipin coated baking powder in the cake mixture. As an example of a formula of this kind, we can employ 29 parts of cake flour, 16 parts of ordinary baker's shortening of a partially hydrogenated type, 41 parts of powdered sugar, 5 parts of powdered cocoa, 1½ parts of coated baking powder produced as described hereinabove, and 3% of dried whole egg powder. Suitable flavoring such as vanilla may be added. When preparing a product to be used in making doughnuts, a suitable formula is used of a type including, for example, flour, salt, dried egg material, sugar, a baking powder type of leavening agent, and, if desired, milk powder and/or shortening.

All of the ingredients are mixed together either by milling, sifting, or other suitable ways of obtaining a thorough and uniform distribution throughout the mixture. The product is packaged and sold in a dry form, ready to be used by the housewife by the admixture of either milk or water to make the desired cake. As previously suggested, instead of coating the baking powder with the hydrophilic lipin, the latter material may be produced first in powder form and sifted in with the flour and other dry ingredients, in which case substantially the same composition will result. When water is added, the hydrophilic lipin promotes the dispersion of the ingredients of the formula in the liquid to produce a better batter and a superior cake or doughnut.

The invention is not limited by the type of baking powder used, nor by the character of other dry ingredients employed. For example, as acid ingredients in the baking powder, we may use alum, calcium acid phosphates, and sodium acid pyro-phosphates with the addition of some other ingredients such as tartaric acid, and cream of tartar which are usually used in baking powder.

A very suitable type of hydrophilic lipin containing free hydroxy groups for use with pulverulent materials in our invention is a mixture of various fatty acid esters of mixed polyglycerols. A very satisfactory material of this kind is produced by first polymerizing glycerine by heating it for a period of four or five hours with about 1% of an alkali as a catalyst. To this is then added a proportion of partially hydrogenated cotton seed oil, plastic at ordinary temperature, the relative amounts being such that on re-esterification the reaction will produce predominant amounts of mono-esters with some di-esters. About $\frac{1}{10}$% of sodium hydroxide or other suitable alkalis is used as a catalyst, and the reaction allowed to proceed for about two hours, maintaining a temperature of about 250 to 260° C. The unreacted polyglycerol remaining is drawn off and the reaction product washed and purified in any suitable way. This class of material is described more in detail in the copending application of Benjamin R. Harris, Serial No. 697,533, filed November 10, 1933.

The product resulting from this treatment is a mixture of fatty acid esters of polyglycerols. This product can be mixed directly with other ingredients to produce a dry mixture. A suitable proportion is about 3 to 4% of this hydrophilic lipin on the basis of the flour in the biscuit, cake or doughnut formula. The baked flour product resulting from the use of this type of material will have a better volume and will resist staling much longer than a baked flour product made from similar ingredients without the hydrophilic lipin.

Another manner of practicing the invention is to bring the hydrophilic lipin containing free hydroxy groups in contact with skimmed milk powder or dried buttermilk. Mixed relatively high molecular weight fatty acid esters of polyglycerols are suitable for this purpose. In incorporating the two types of materials together, the hydrophilic lipin may be mixed with the pulverulent milk powder by either grinding the two together or adding the hydrophilic lipin in melted condition to the milk powder, allowing it to cool and then subdividing the mass by suitable means.

Another satisfactory manner of effecting the intended result is to take ordinary liquid skim milk or buttermilk and disperse the hydrophilic lipin therein by suitable means, using an homogenizer or similar instrument, if desired, to get a fine subdivision and disperson of the hydrophilic lipin. When employing the mixed esters referred to, about two to four percent may be incorporated in the milk suitably. The milk, with the hydrophilic lipin added to it, is then spray dried to a fine powder or dried in any suitable manner and treated afterward, if required, to form a fine pulverulent mass. Such a product contains protein material of milk, milk sugar, inorganic milk salts and about 15 to 27% or more of the hydrophilic lipin, depending upon the amount that was originally dispersed in the liquid milk product. This product may be used in various baking formulas, as it has its own specific properties, the hydrophilic lipin being finely dispersed and offering a very large surface, and therefore being very active in modifying the surface characteristics of the various constituents used in the baking formula. Any of the hydrophilic lipins, either as mixtures or as substantially pure materials, may be used in this form of the invention.

A suitable amount of the polyglyceride ester containing free OH groups or any other suitable hydrophilic lipin may be incorporated with a fat plastic at ordinary temperature and homogenized with skimmed milk, milk or buttermilk and spray dried to produce a pulverulent dry material suitable for baking purposes and which may be vended as a composition to be used in baking, or it may be incorporated with other pulverulent materials such as sugar, baking powder, flour, dry egg material, etc.

Various examples and details of the invention have been described, but these examples and details are not to be considered as limitations of the scope of the invention. For example, many different methods may be employed for bringing in contact the pulverulent material, such as baking powder with the hydrophilic lipin or for reducing the hydrophilic lipin to pulverulent form for incorporation into a dry mixture. In each case, the types of materials selected and the manner of compounding them will be determined by the use to which the final product is to be put. The nature of the ingredients, such as the flour, for example, must take into consideration the intended purpose of the final product. It is also to be borne in mind that the hydrophilic lipin employed must be of an edible or innocuous nature. The types of hydrophilic lipins referred to specifically are in general edible and can be used safely.

What we claim as new and desire to protect by Letters Patent of the United States is:

1. A process for improving baked flour products which includes the steps of comminuting and intimately mixing a pulverulent hydrophilic lipin having at least one unesterified hydroxy group, said hydrophilic lipin being selected from the group consisting of higher fatty acid esters of glycerin, polyglycerols, sugars, sugar alcohols, and hydroxy-carboxylic acids, and a dry, non-farinaceous ingredient used in baked flour products, the amount of hydrophilic lipin being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

2. A process for improving baked flour products which includes the steps of comminuting and intimately mixing a hydroxy fatty ester having at least two unesterified hydroxy groups and consisting of a polyhydroxy substance incompletely esterified with higher fatty acid, and a dry, non-farinaceous ingredient used in baked flour products, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

3. A process for improving baked flour products which includes the steps of comminuting and intimately mixing a fatty ester of the group consisting of monoglycerides and diglycerides of higher fatty acids, and a dry ingredient used in baked flour products selected from the group consisting of sugar, leavening agent, salt, dried milk material, and dried egg material, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

4. A process for improving baked flour products which includes the steps of comminuting and intimately mixing a hydroxy fatty ester having at least one unesterified hydroxy group and consisting of polyglycerol incompletely esterified with higher fatty acid, and a dry, non-farinaceous ingredient used in baked flour products, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

5. A process for improving baked flour products which includes the steps of comminuting and intimately mixing a hydroxy fatty ester having at least two unesterified hydroxy groups and consisting of a polyhydroxy substance containing more than three carbon atoms incompletely esterified with higher fatty acid, and a dry, non-farinaceous ingredient used in baked flour products, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

6. A process for improving baked flour products which includes the steps of comminuting and intimately mixing a hydroxy fatty ester having at least one unesterified hydroxy group and consisting of a polyhydroxy substance containing more than three carbon atoms incompletely esterified with higher fatty acid, and a dry ingredient used in baked flour products, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

7. A process for improving baked flour products which includes the steps of comminuting and intimately mixing a hydroxy fatty ester having at least one unesterified hydroxy group and consisting of a polyglycerol incompletely esterified with higher fatty acid, and a dry ingredient used in baked flour products, the amount of the ester being sufficient to materially improve the texture, tenderness, and keeping qualities of baked goods in which the mixture is used, and thereafter admixing such dry comminuted mixture with other ingredients of baked flour products to form a dough or batter suitable for baking.

8. A prepared flour composition in substantially dry form, said composition containing flour, shortening, and a hydroxy fatty ester having at least one unesterified hydroxy group, said ester consisting of a polyhydroxy substance, the latter containing more than three carbon atoms, incompletely esterified with higher fatty acid, the amount of the ester being sufficient to materially improve the texture, tenderness, and keeping qualities of baked goods in which the composition is used.

9. A substantially dry powdered mixture containing flour, shortening, and a high melting point hydroxy fatty ester having at least two unesterified hydroxy groups and consisting of a polyhydroxy substance, the latter containing more than three carbon atoms, incompletely esterified with higher fatty acid.

10. A process for improving baked flour products which includes the steps of comminuting and intimately mixing a hydroxy fatty ester having at least one unesterified hydroxy group and consisting of a polyhydroxy substance incompletely esterified with higher fatty acid, and a dry ingredient used in baked flour products selected from the group consisting of sugar, leavening agent, salt, dried milk material, and dried egg material, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

11. A process for improving baked flour products which includes the steps of comminuting and intimately mixing a high melting point hydroxy fatty ester having at least one unesterified hydroxy group and consisting of a polyhydroxy substance incompletely esterified with higher fatty acid, and a dry non-farinaceous ingredient used in baked flour products, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

12. A process for improving baked flour products which includes the steps of separately comminuting and intimately mixing a high melting point hydroxy fatty ester having at least one unesterified hydroxy group and consisting of a polyhydroxy substance incompletely esterified with higher fatty acid, and a dry ingredient used in baked flour products selected from the group consisting of sugar, leavening agent, salt, dried milk material, and dried egg material, the amount of the ester being sufficient to materially improve the texture, tenderness, and keeping qualities of baked goods in which the mixture is used, and thereafter admixing such dry comminuted mixture with other ingredients of baked flour products including flour, shortening and aqueous material to form a dough or batter suitable for baking.

MARVIN C. REYNOLDS.
BENJAMIN R. HARRIS.
ALBERT K. EPSTEIN.